United States Patent
Janardhanan et al.

(10) Patent No.: US 9,779,614 B2
(45) Date of Patent: Oct. 3, 2017

(54) SYSTEM AND METHOD OF ALERTING CMS AND REGISTERED USERS ABOUT A POTENTIAL DURESS SITUATION USING A MOBILE APPLICATION

(71) Applicant: Honeywell International Inc., Morristown, NJ (US)

(72) Inventors: Shaiju Janardhanan, Bangalore (IN); Hemanth Pv, Bangalore (IN); Ravikumar Vemagal Aswath, Bangalore (IN); Deepak Sundar Meganathan, Bangalore (IN); Vinay Hegde, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 15/041,797

(22) Filed: Feb. 11, 2016

(65) Prior Publication Data

US 2016/0180696 A1    Jun. 23, 2016

Related U.S. Application Data

(63) Continuation of application No. 14/173,048, filed on Feb. 5, 2014, now Pat. No. 9,299,243.

(51) Int. Cl.
*G08B 23/00* (2006.01)
*G08B 25/00* (2006.01)
(Continued)

(52) U.S. Cl.
CPC ....... *G08B 25/008* (2013.01); *G08B 13/1968* (2013.01); *G08B 13/19645* (2013.01);
(Continued)

(58) Field of Classification Search
CPC ............ G08B 25/008; G08B 13/19645; G08B 13/19656; G08B 13/1968; G08B 25/10; G08B 29/16; H04N 7/181
(Continued)

(56) References Cited

U.S. PATENT DOCUMENTS

| 7,019,671 B2 | 3/2006 | Kawai |
| 7,113,090 B1 | 9/2006 | Saylor et al. |

(Continued)

FOREIGN PATENT DOCUMENTS

WO    WO 2008/145134 A1    12/2008

OTHER PUBLICATIONS

Great Britain's Intellectual Property Office's Combined Search and Examination Report, dated May 14, 2015, corresponding to Application No. GB1501347.7.
(Continued)

*Primary Examiner* — John A Tweel, Jr.
(74) *Attorney, Agent, or Firm* — Husch Blackwell LLP

(57) ABSTRACT

Systems and methods of alerting a central monitoring station and registered users about a potential duress situation using a mobile application are provided. Some methods can include receiving user input to access a remote security system, responsive to receiving the user input, determining whether the user input includes a first type of user input or a second type of user input, when the user input includes the second type of user input, collecting additional information from an ambient environment, transmitting a duress message to a central monitoring station, the duress message including the additional information.

18 Claims, 3 Drawing Sheets

(51) Int. Cl.
　　　G08B 25/10　　　(2006.01)
　　　G08B 13/196　　(2006.01)
　　　H04N 7/18　　　(2006.01)
　　　G08B 29/16　　　(2006.01)
(52) U.S. Cl.
　　　CPC ....... *G08B 13/19656* (2013.01); *G08B 25/10* (2013.01); *G08B 29/16* (2013.01); *H04N 7/181* (2013.01)
(58) Field of Classification Search
　　　USPC .................. 340/501, 541, 506, 937; 348/143
　　　See application file for complete search history.

(56) References Cited

U.S. PATENT DOCUMENTS

| | | |
|---|---|---|
| 7,253,732 B2 | 8/2007 | Osann, Jr. |
| 7,423,529 B2 | 9/2008 | Singer et al. |
| 8,618,934 B2 | 12/2013 | Belov et al. |
| 9,299,243 B2 * | 3/2016 | Janardhanan ........ G08B 25/008 |
| 2005/0245229 A1 | 11/2005 | Brown et al. |
| 2010/0283609 A1 | 11/2010 | Remer |
| 2012/0106782 A1 | 5/2012 | Nathan et al. |
| 2013/0091561 A1 | 4/2013 | Bruso et al. |

OTHER PUBLICATIONS

Examination report from corresponding Canadian patent application 2,880,597, dated Mar. 17, 2017.

* cited by examiner

SYSTEM AND METHOD OF ALERTING CMS AND REGISTERED USERS ABOUT A POTENTIAL DURESS SITUATION USING A MOBILE APPLICATION

CROSS-REFERENCE TO RELATED APPLICATIONS

This application is a continuation of and claims the benefit of the filing date of U.S. application Ser. No. 14/173,048 filed Feb. 5, 2014.

FIELD

The field relates to security systems and, more particularly, to methods and an apparatus for remotely controlling security systems.

BACKGROUND

Security systems are generally known. Such systems are typically used within homes or businesses to detect threats to the safety and/or assets of persons authorized to use the area.

Such systems typically include a number of sensors placed within the a secured area. The sensors may include fire detection devices, gas detection devices, intrusion detectors, or any combination of such devices.

The sensors may be monitored by a control panel located within the secured area or in some other area. Upon detection of a threat, the control panel may sound a local audible alarm and send an alarm message to a central monitoring station.

The control panel may be used in conjunction with a user interface that is located near an entrance to the secured area. The user interface may be used by an authorized user of the secured area to arm and disarm the security system.

Recent developments have included the use of an Internet interface to the control panel that allows a remotely located user to arm or disarm the security system. While such systems work well, they can be misused. Accordingly, a need exists for better methods for monitoring the use of such systems.

DETAILED DESCRIPTION OF AN ILLUSTRATED EMBODIMENT

Figure 1:
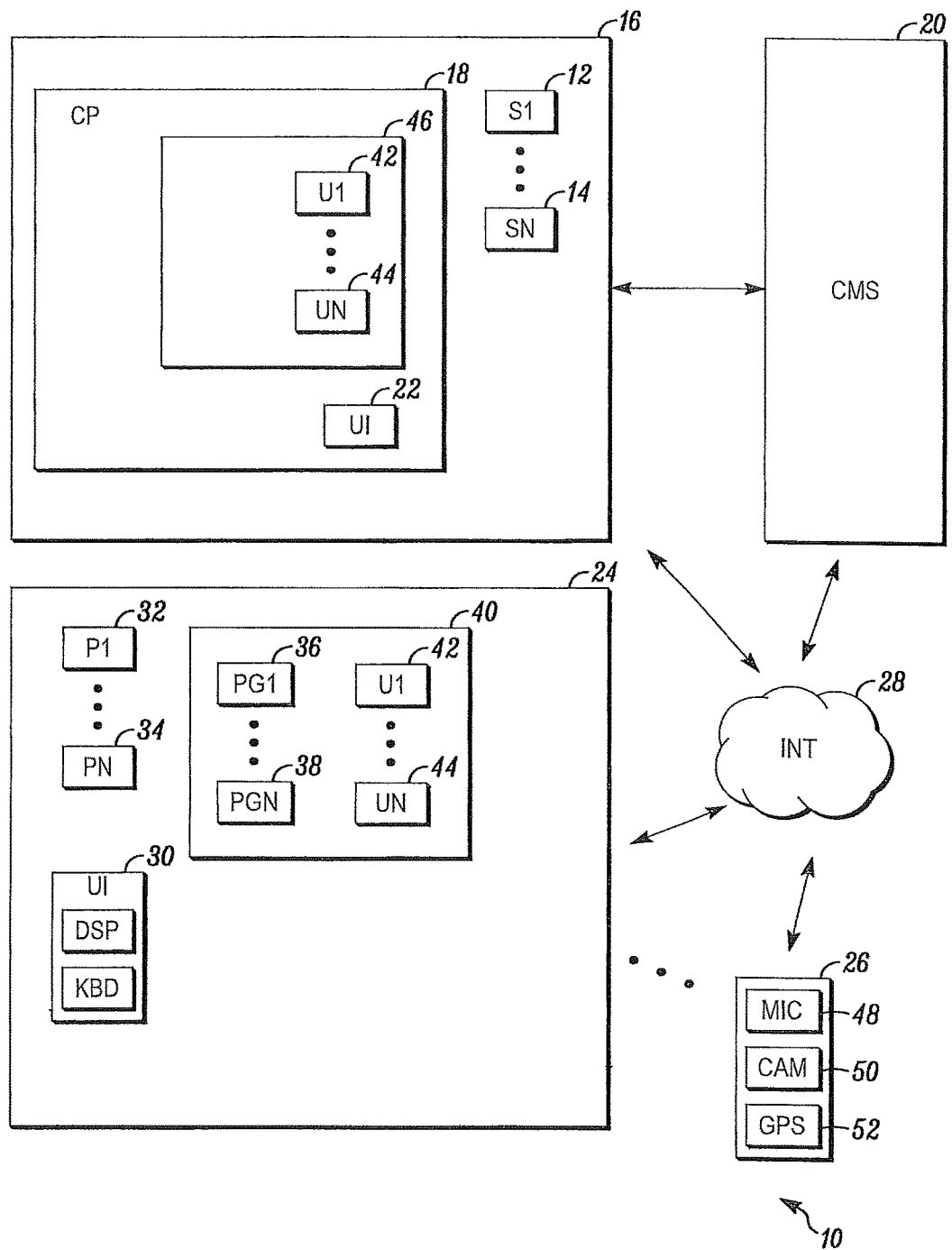
FIG. 1 is a simplified block diagram of a security system shown generally in accordance with an illustrated embodiment.

While embodiments can take many different forms, specific embodiments thereof are shown in the drawings and will be described herein in detail with the understanding that the present disclosure is to be considered as an exemplification of the principles hereof as well as the best mode of practicing the same. No limitation to the specific embodiment illustrated is intended.

FIG. 1 is a block diagram of a security system 10 shown generally in accordance with an illustrated embodiment. Included within the system are a number of sensors 12, 14 used to detect threats within a secured area 16. The secured area may be defined by the periphery of a home or business.

The sensors may be based upon any of a number of different technologies. For example, some of the sensors may be limit switches placed on the doors or windows of the home or business. Other sensors may be motion detectors based upon PIR detection or upon cameras with video image processors that detect changes between adjacent frames captured by the cameras.

Still other sensors may detect environmental threats within the home or business. For example, some of the sensors may be fire or smoke detectors. Other sensors may detect natural gas or carbon monoxide.

The sensors, in turn, are monitored by a control panel 18 either located within the secured area or in some other area. Upon detection of the activation of one of the sensors, the control panel may activate a local alarm and send an alarm message to a central monitoring station 20. The central monitoring station may, in turn, summon the appropriate help (e.g., police, fire department, etc.).

The security system may be controlled via a local user interface 22 located near an entrance to the secured area. In this regard, the security system may be armed or disarmed through the local user interface via an authorized user entering a personal identifier along with a function identifier entered through the user interface.

The security system may also be controlled via one or more wireless portable devices 24, 26. In this regard, a corresponding user interface 30 within each of the portable devices may operate to emulate the operation of the user interface within the secured area.

Located within each of the portable devices (and within the control panel and central monitoring station) is one or more processor apparatus (processors) 32, 34 each operating under control of one or more computer programs 36, 38 loaded from a non-transitory computer readable medium (memory) 40. As used herein, reference to a step performed by a computer program is also reference to the processor that executed that step.

Once armed, an alarm processor of the control panel may monitor each of the sensors. Upon detection of activation of a sensor, the alarm processor may activate the local alarm and compose an alarm message to the central monitoring station. The alarm message may include an identifier of the secured area, an identifier of the sensor, and a time of activation.

The alarm processor may be controlled by a status processor. The status processor may be a state machine that assumes a state or status, including one of armed away, armed stay, or disarmed, based upon input from an authorized user through one of the user interfaces.

In this regard, the alarm processor may monitor all or some of the sensors based upon the state of the status processor. For example, in the armed away state, the alarm processor may monitor and report an alarm upon activation of any sensor. In the armed stay state, the alarm processor may only report activation of any environmental sensor or intrusion sensors along the periphery of the secured area. In the disarmed state, the alarm processor may only report the activation of environmental sensors.

The status processor may receive inputs via an interface processor that authenticates users via a source and content of an input. For example, when an input is received from the user interface within the secured area, the interface processor may only require a personal identification number (PIN) of an authorized user and the activation of a function key (e.g., arm away, arm stay, disarm, etc.).

In this regard, a memory 46 of the control panel of the security system may include a separate user file 42, 44 containing a different PIN for each authorized user. In addition, each user may have a different level of authorization. For example, in the case of a home, the owner may have the highest level of authorization and be able to select any operating mode. In contrast, the children of the owner may have a lesser authorization that only disables the security system for a short time that allows the children to enter and leave the secured area without triggering an alarm.

The interface processor may also accept instructions from and return data to each of the wireless portable devices. In this regard, a corresponding mobile interface processor within a portable device may form a secure connection between the portable device and the control panel. This secure connection may be formed under any of a number of different formats (e.g., Total Connect™ by Honeywell International Inc.) in such a way that the look and feel of the user interface within the secured area may be emulated on a corresponding user interface of the portable device.

Figure 3:
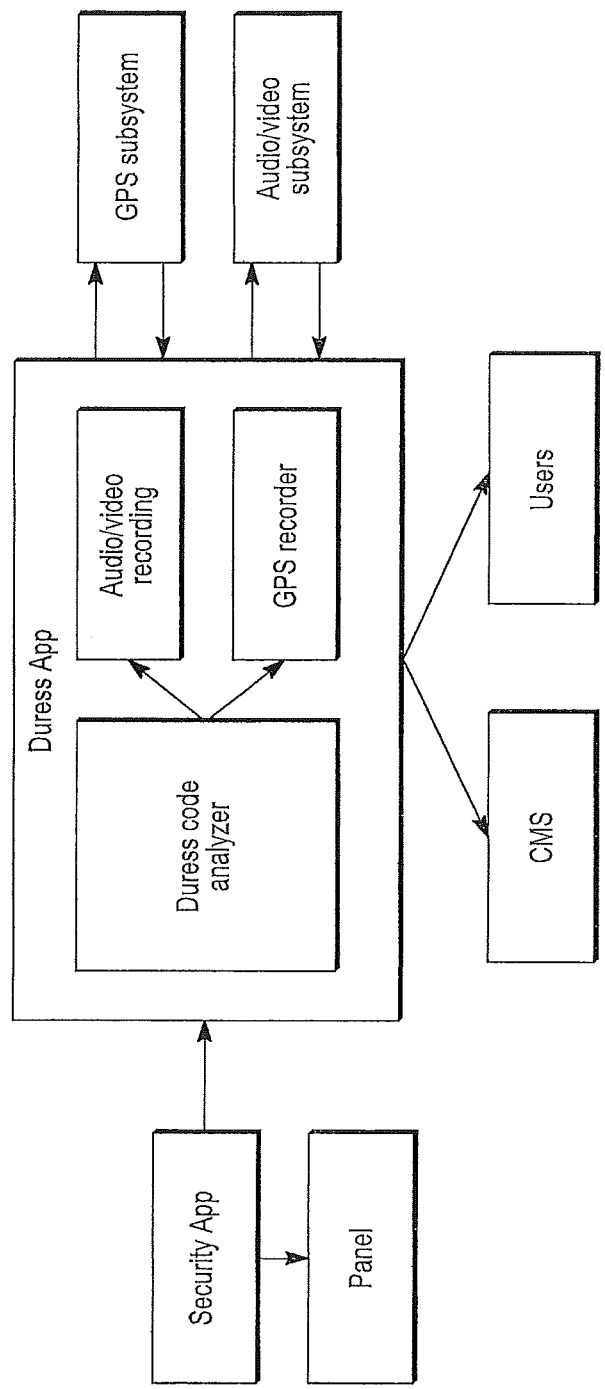
FIG. 3 depicts a particular architecture that may be used by the system of FIG. 1.

Under the illustrated embodiment, one or more of the wireless portable devices may include a duress reporting system that detects and reports use of a portable device to gain access into the secured area where the use is under duress. The duress reporting system may include one or more processors and corresponding software, as shown in FIG. 3, executing on those processors.

The duress reporting system may be useful in situations where a user is forced to access or otherwise circumvent the security system under duress. For example, if an authorized user is coerced by a criminal into allowing access into the secured area (by disarming the security system), then the duress reporting system may detect the attempt to gain access and automatically report the attempt to the central reporting system and to other authorized users.

Under one particular embodiment, the duress reporting system may detect the existence of duress via a duress PIN entered through the user interface. In this case, the user file 42, 44 of each user may have a first and second PIN number. Entry of either PIN number may cause the status processor of the security system to accept and execute a function command in accordance with the authorization level for a corresponding user. In this case, the first PIN number may be a non-duress PIN number, and the second PIN number may be the duress PIN number. Entry of the first PIN number and function command causes the portable device and security system to operate conventionally. Entry of the second duress PIN number causes the portable device to additionally collect information from the environment of the portable device and report that collected information to the central monitoring station.

In some embodiments, the portable devices may have two different disarm softkeys displayed on the screen. One disarm softkey is associated with normal operation, and the other is associated with duress.

In this regard, each of the portable devices includes a microphone 48, one or more cameras 50, and a geographical positioning (e.g., a Global Positioning System (GPS)) device 52. Upon the detection of duress by the duress reporting system, the system collects information from one or more of these devices and from the geographical positioning device and sends the collected information to the central monitoring station.

The collected information may include at least a sequence of images of the user and environment around the user for a predetermined time period (e.g., 10 seconds) along with the geographic location of the user. A voice recording may also be included to further define the environment and cause of the duress. In the case of a portable device with a camera on both sides of the device, images may be collected from both cameras for playback by security personnel and other authorized users.

In general, the duress reporting system may operate under any of a number of different formats. For example, a duress detection processor may operate in the background within the portable device to detect entry of a PIN and to compare the PIN with the list of pins within the user file. If a match between the entered PIN and duress PIN is detected, then the duress detection processor or a separate information collection processor may activate one or more of the microphone and camera(s) to collect information regarding the environment of the event.

Upon collection of the environmental information, a communication processor may compose a duress message addressed to an alerting processor within the central monitoring station. The alerting processor may display the collected information for the benefit of security personnel at the central monitoring station along with an indication that the user may be using his/her portable device under duress. The alert may include an identifier of the portable device, an identifier of the authorized user, and the geographical location from where the alert was initiated.

In addition to forwarding the collected information to the central monitoring station, a forwarding processor within the central monitoring station may forward the duress message to one or more portable devices of other people authorized to control the security system. Alternatively, the communication processor of the originating portable device may forward the duress message directly to the other portable devices.

In other embodiments, components of the duress reporting system may be located within the control panel of the secured area and/or in the central monitoring station. For example, the duress detection processor may be located in the control panel and detect a duress PIN from that location. In this case, the duress detection processor may compose and send a message to the collection processor initiating the collection of information regarding the context of the duress.

In other embodiments, the duress detection processor may operate in conjunction with other components of the portable device to detect duress. For example, a voice recognition processor coupled to the microphone may detect words or phrases spoken in the vicinity of the portable unit. The voice recognition processor may compare the words with a word reference list in memory to detect words of threat spoken by other people in the vicinity of the authorized user. If the duress detection processor should detect both an attempt to access or control the security system and words of threat (within some predetermined time period), then the threat detection processor may initiate and send a duress report to the central monitoring station.

In other embodiments, the duress detection processor may detect duress and initiate the sending of a duress report based upon other factors. For example, the number of repeated attempts to change a security setting above some threshold value may indicate duress. Alternatively, the duress detection processor may retrieve weather conditions at the geographic location of the user. In this case, the detection of severe weather in conjunction with the user not changing his/her geographic location while also attempting to modify a setting of the security system may indicate duress. Similarly, the mere presence of the authorized user in a high crime area for a predetermined time period in conjunction with the user attempting to change a security system setting may indicate duress.

Figure 2:
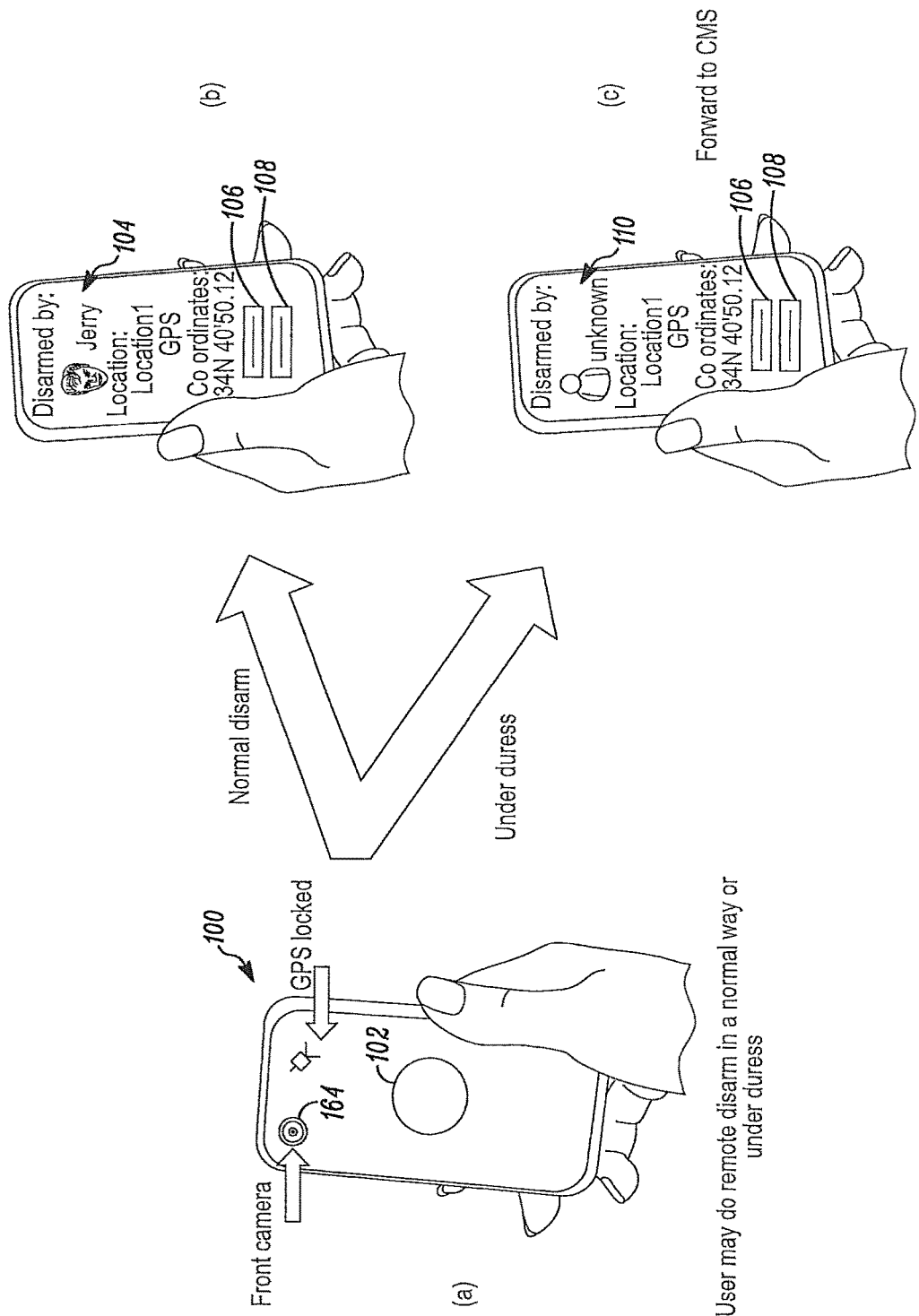
FIG. 2 depicts a set of display screens of a portable device used by the system of FIG. 1.

In another embodiment, an access report may be sent to the portable devices each time a security setting is changed as illustrated in FIG. 2. For example, FIG. 2a shows one of the portable devices of FIG. 1 (now identified by the reference number 100). The display of the portable device may include one or more disarm softkeys 102.

In this example, an image processor may use image recognition software to compare an image from a front camera 164 with an image of the authorized user saved in memory. In this case, once the user activates the disarm button 102, the duress detection processor may review the context of the disarm command, including any one or more of the factors discussed above. The duress processor may also use an output from the face recognition software to analyze and determine the identity of the user. If the disarm command appears to be normal, then a disarm alert may be sent to each of the portable devices, as shown in FIG. 2b. In this case, the alert may depict an image 104 of the user, the name of the recognized user, the coordinates of the user's location, and a set of decision keys 106, 108. If another user decides that the disarm looks suspicious, then that other user may activate a "FORWARD TO CMS" key 106 forwarding the alert to the central monitoring station. If not, then the user may activate an "IGNORE" softkey 108. If the alert is forwarded to the central monitoring station, then security personnel may be automatically notified of the concern and may take the appropriate action.

If the duress detection processor cannot identify the user or detects duress using one or more of the factors discussed above, then the alert of FIG. 2c may be sent to each user of the portable devices. In this case, the alert may include an image 110 of the unrecognized user, an indicator that the user was not recognized, and the location of the portable device. If another user recognizes the user, then that other user may activate the IGNORE softkey. If not, then the other user may activate the FORWARD TO CMS softkey to forward the alert to the central monitoring station.

The duress reporting system may be useful in any of a number of different situations. For example, a criminal may hold a homeowner hostage at a remote location while coercing the homeowner to disable the security system on his/her home. At the same time, the criminal may send accomplices to burglarize the home of the owner once the security system is disabled.

In this case, the burglary may be thwarted by sending police to the home and to the location from which the duress report originated. In addition, the images and audio of the duress report may be used as evidence against the criminal(s) perpetrating the event.

In general, the security system includes a wireless portable device that arms and disarms the security system through a wireless interface, the wireless portable device having a camera, a microphone, and a global positioning system (GPS), and a processor of the wireless portable device that detects disarming of the security system by a user under duress through the wireless portable device, captures information of an environment of the wireless portable device from the GPS and one or more of the camera and microphone, and sends the captured information to a central monitoring station of the security system through the wireless interface.

Alternatively, the security system includes a wireless portable device with a wireless interface that arms and disarms a security system, the wireless portable devices having a user interface, a camera, a microphone, and a global positioning system (GPS), and a processor of the wireless portable devices that detects disarming of the security system by a user under duress through the user interface, captures information of an environment of the wireless portable device from the GPS and one or more of the camera and microphone, and sends the captured information to another wireless portable device through the wireless interface.

As a still further alternative, the system includes a security system, a plurality of wireless portable devices each with a wireless interface that arms and disarms a security system and each having a user interface, a camera, a microphone, and a global positioning system (GPS), and a processor of each of the wireless portable devices that detects disarming of the security system by a user under duress through the user interface, captures information of an environment of the wireless portable device from the GPS and one or more of the camera and microphone, and sends the captured information to another of the plurality of wireless portable devices or a central monitoring station of the security system through the wireless interface.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A method comprising:
   receiving user input to access a remote security system;
   responsive to receiving the user input, determining whether the user input includes a first type of the user input or a second type of the user input;
   when the user input includes the second type of the user input, collecting additional information from an ambient environment; and
   transmitting a duress message to a central monitoring station, the duress message including at least the additional information,
   wherein receiving the user input includes receiving a first personal identification number, and
   wherein determining whether the user input includes the first type of the user input or the second type of the user input includes determining whether the first personal identification number includes a duress personal identification number or a non-duress personal identification number.

2. The method of claim 1 further comprising transmitting a signal to execute a function associated with the user input responsive to either the duress personal identification number or the non-duress personal identification number.

3. The method of claim 1 wherein collecting the additional information from the ambient environment includes collecting the additional information from one or more of a local microphone, a local camera, or a local GPS device.

4. The method of claim 3 further comprising:
identifying an ambient geographical location from the local GPS device;
identifying a first weather condition at the ambient geographical location;
determining whether the first weather condition includes a severe weather condition and whether the ambient geographical location has changed within a predetermined period of time; and
when the first weather condition includes the severe weather condition and the ambient geographical location has failed to change within the predetermined period of time, transmitting the duress message.

5. The method of claim 3 further comprising:
identifying an ambient geographical location from the local GPS device;
identifying whether the ambient geographical location is located within a designated high crime area; and
when the ambient geographical location is located within the designated high crime area, transmitting the duress message.

6. The method of claim 3 further comprising:
obtaining a first image of a first user who provided the user input from the local camera;
determining whether the first image of the first user matches a saved image of an authorized user; and
when the first image of the first user fails to match the saved image of the authorized user, transmitting the duress message.

7. The message of claim 3 further comprising:
obtaining first image of a first user who provided the user input from the local camera;
determining whether the first image of the first user matches a saved image of an authorized user; and
when the first image of the first user matches the saved image of the authorized user, transmitting a security system access alert to one or more portable devices, the security system access alert including at least the first image of the first user.

8. The method of claim 1 further comprising collecting the additional information from the ambient environment for a predetermined period of time.

9. The method of claim 1 further comprising transmitting the duress message to one or more wireless portable devices.

10. The method of claim 1 wherein receiving the user input includes receiving audio from a local microphone, wherein determining whether the user input includes the first type of the user input or the second type of the user input includes determining whether the audio matches an entry in a threat word reference list and whether the audio is received within a predetermined time period of receiving the first personal identification number, and wherein transmitting the duress message includes transmitting the duress message when the audio matches the entry in the threat word reference list and the audio is received within the predetermined period time period of when the first personal identification number is received.

11. The method of claim 1 wherein receiving the user input includes identifying a number of attempts made to access the security system, wherein determining whether the user input includes the first type of the user input or the second type of the user input includes determining whether the number of attempts is greater than a predetermined number, and wherein transmitting the duress message includes transmitting the duress message when the number of attempts is greater than the predetermined number.

12. A method comprising:
receiving a command message from a first wireless portable device;
responsive to receiving the command message, determining whether the command message includes a first type of user input or a second type of the user input; and
when the command message includes the second type of the user input, transmitting a signal to the first wireless portable device instructing the first wireless portable device to collect additional information from an ambient environment of the first wireless portable device,
wherein receiving the command message from the first wireless portable device includes receiving a first personal identification number, and
wherein determining whether the command message includes the first type of the user input or the second type of the user input includes determining whether the first personal identification number includes a duress personal identification number or a non-duress personal identification number.

13. The method of claim 12 further comprising executing a command included in the command message when the command message includes either the duress personal identification number or the non-duress personal identification number.

14. The method of claim 12 further comprising:
identifying a geographical location of the first wireless portable device;
identifying a first weather condition associated with the geographical location;
determining whether the first weather condition includes a severe weather condition and whether the ambient geographical location has changed within a predetermined period of time; and
when the first weather condition includes the severe weather condition and the ambient geographical location has failed to change within the predetermined period of time, transmitting the signal to the first wireless portable device.

15. The method of claim 12 further comprising:
identifying an ambient geographical location of the first wireless portable device;
identifying whether the ambient geographical location is located within a designated high crime area; and
when the ambient geographical location is located within the designated high crime area, transmitting the signal to the first wireless portable device.

16. The method of claim 12 further comprising:
identifying a first image of a first user included in the command message;
determining whether the first image of the first user matches a saved image of an authorized user;
when the first image of the first user fails to match the saved image of the authorized user, transmitting the signal to the first wireless portable device; and
when the first image of the first user matches the saved image of the authorized user, transmitting a security system access alert to at least a second wireless portable device, the security system access alert including at least the first image of the first user.

17. The method of claim 12 wherein the command message includes audio, wherein determining whether the command message includes the first type of the user input or the second type of the user input includes determining whether the audio matches an entry in a threat word reference list and whether the audio is received within a predetermined time period of receiving the first personal identification number, and wherein transmitting the signal to the first wireless portable device includes transmitting the signal when the audio matches the entry in the threat word reference list and the audio is received within the predetermined time period of receiving the first personal identification number.

18. The method of claim 12 further comprising:
identifying a number of attempts to access the security system made by the first wireless portable device;
determining whether the number of attempts is greater than a predetermined number; and
transmitting the signal to the wireless portable device when the number of attempts is greater than the predetermined number.

* * * * *